3,360,402
PRODUCTION OF NEGATIVE ELECTRODES FOR FUEL CELLS
Karl Ackermann, deceased, late of Mannheim, Germany, by Karl Siebert, representative, Kuhbach, near Lahr, Germany, assignor to Badische Anilin- & Soda-Fabrik Aktiengesellschaft, Ludwigshafen (Rhine), Germany
No Drawing. Filed Oct. 8, 1965, Ser. No. 495,030
Claims priority, application Germany, Oct. 16, 1964, B 78,937
11 Claims. (Cl. 136—120)

The present invention relates to a process for the production of negative electrodes for fuel cells.

Various requirements have to be met by negative electrodes for fuel cells. They should exhibit not only a high catalytic activity and a large specific surface area, but also good electrical conductivity. Furthermore they should have adequate mechanical stability and should be as easy to prepare as possible.

It is known that porous sintered nickel shapes may be used as hydrogen electrodes. They have good mechanical stability and an adequate electrical and thermal conductivity. Their catalytic activity however is not very high so that they can only be used at working temperatures above about 200° C.

Double-skeleton catalyst electrodes (DSK electrodes) which have recently become known have a good catalytic activity. These electrodes contain, as the active material, granules of Raney nickel which are embedded in a sintered nickel grid. A substantial disadvantage of these electrodes is their relatively expensive and protracted method of production.

It is an object of the present invention to provide a simple process for the production of negative electrodes with high mechanical stability and high catalytic activity for fuel cells. It is a particular object of the present invention to provide a process for the production of hydrogen electrodes for fuel cells. These objects can be achieved by allowing an aqueous solution of at least one salt of a weakly basic metal in the presence of anions having an oxidizing action and then allowing an aqueous solution of a hydroxide of an alkali metal to act on powdered nickel and/or cobalt, with or without previous sintering into a porous shaped member having the dimensions of the electrode to be prepared, washing the material with water and preferably drying it and then reducing the treated material, with or without previous sintering and/or press molding, with hydrogen at a temperature of from 200° to 900° C.

The metal powder of nickel and/or cobalt used is advantageously one which has been obtained in a conventional manner from the corresponding carbonyls by pyrolysis. The particle size of the metal powder is advantageously from about 1 to 5 microns.

Examples of salts of weakly basic metals are the salts of zinc, chromium, nickel, cobalt, titanium and zirconium. Particularly advantageous results are achieved by using a salt of aluminum as the salt of a weakly basic metal. The solutions may contain one or more salts. It is advantageous to choose metal salt solutions having the highest possible concentration for treating the nickel or cobalt powder. For example an aluminum nitrate solution which contains 2 to 3 parts (parts by weight) of crystallized aluminum nitrate in 1 part of water is very suitable. Chlorate ions, persulfate ions and particularly nitrate ions are examples of oxidizing anions. To achieve an extensive activation of the metal powder it is advantageous to add a weak acid, for example acetic acid, to the solutions. The weak acids may be defined quite generally as acids which do not obey Ostwald's dilution law. For example a salt solution to which about 10% by weight of acetic acid has been added is very suitable. Treatment of the metal powder is effected at a temperature of about 20° to 90° C. By the action of the solutions the metal is converted, more or less extensively depending on the way in which the reaction is carried out, into oxidic compounds from which the active form of the metal is formed after reduction. The duration of the treatment depends on the chosen concentration, the composition of the salt solution, the temperature set up and the desired activation of the metal. When using an almost concentrated aluminum nitrate solution, for example, an adequate conversion of nickel into its oxidic compounds is achieved after a reaction period of two hours at temperatures of 60° to 80° C. When treating porous sintered frameworks, activation can be carried particularly far by impregnating the framework with the salt solution and then leaving the impregnated framework in an atmosphere saturated with water vapor at a temperature of from 60° to 90° C. for about 30 to 120 minutes. Following the treatment of the metal with the salt solution, it is treated at temperatures of 20° to 90° C. with a solution of a hydroxide of an alkali metal, advantageously as concentrated as possible. The metal is then washed well with water and preferably dried.

When starting from a powder in the production of electrodes in accordance with this invention, the powder, after it has been treated with the solution of salt of a weakly basic metal and subsequently with an aqueous solution of an alkali metal hydroxide and washed (and optionally dried), is press-molded into a shaped article which advantageously has the dimensions of the electrode to be made, and if desired sintered. This sintering may however be dispensed with because sintering occurs in the subsequent reduction, depending on the temperature used. The sintering of the shaped article is carried out at a temperature of from about 450° to 600° C. A pressure of about 0.25 to 3 metric tons per sq. cm. is used for press molding. To facilitate press molding and sintering, it is particularly advantageous to add untreated powder to the treated powder in the ratio by weight of 1:2 to 2:1 prior to press molding and sintering.

If on the other hand porous shaped articles of nickel and/or cobalt which have already been sintered are used for the production of electrodes in accordance with this invention, the abovementioned sintering and press molding of the shaped article which has been treated with salt solution prior to press molding may be omitted. It is however advantageous in this case as well to carry out press molding and sintering of the shaped article under the abovementioned conditions prior to reduction.

The shaped article is finally subjected to reduction at temperatures of 200° to 900° C. in a hydrogen atmosphere. The reduced material is pyrophoric and has to be stored with exclusion of air.

The electrodes according to this invention are distinguished by a number of advantages. In addition to a remarkable mechanical stability, they have a high catalytic activity. Thus for example practically the theoretical hydrogen potential is set up even at room temperature in caustic potash solution as electrolyte. Production of the electrodes is relatively simple. Electrodes which have been prepared using salt solutions whose metal oxides are not reducible at a temperature below 1000° C. have the considerable advantage that as soon as their activity subsides, for example as a result of poisoning, they may be regenerated by treatment in a hydrogen atmosphere at temperatures of for example 300° to 600° C. They regain their original activity after such a regeneration.

The following examples will further illustrate the present invention.

*Example 1*

A porous plate having a thickness of about 5 mm. is prepared by sintering carbonyl nickel powder whose bulk density is 0.4 g./ccm. The sintering temperature is about 800° to 850° C. The plate is then impregnated with a solution of aluminum nitrate which contains 2.5 parts by weight in 1 part of water and placed on a grate located in a closed vessel having water in it at the bottom. The whole is slowly heated to a temperature of 80° to 90° C. and the sintered plate is left at this temperature for two hours. The plate is then immersed for about an hour in an aqueous 20% by weight solution of potassium hydroxide at 50° C., rinsed and dried. Discs having a diameter of 20 mm. are stamped out from the plate thus treated and these are pressed using a pressure of 1 metric ton per sq. cm. The discs are then reduced in a hydrogen atmosphere at a temperature of 550° C. until water vapor is no longer detectable in the offgas.

The finished pyrophoric electrode has to be stored with exclusion of air, for example in caustic potash solution, methanol or benzene. At a hydrogen pressure of 1.5 atmospheres gauge, almost the theoretical hydrogen potential is set up on the electrode.

*Example 2*

A porous nickel plate prepared as described in Example 1 is impregnated with an almost saturated nickel nitrate solution (containing 330 ml. of 40% acetic acid per liter) and further treated as described in Example 1 up to the reduction.

The discs are then reduced in a hydrogen atmosphere at a temperature of 220° C. until no water vapor can be detected in the offgas.

The properties of this electrode match those of the electrode prepared according to Example 1.

*Example 3*

(a) A porous sintered nickel plate prepared as described in Example 1 is impregnated with a solution prepared by mixing a solution of 3 parts by weight of nickel nitrate in 1 part by weight of water and a solution of 2.5 parts by weight of aluminum nitrate in 1 part by weight of water in the ratio 3:1 and treated as described in Example 1 up to the stamping of the discs. The discs are sintered for ninety minutes in an atmosphere of nitrogen at a temperature of 550° C., cooled and pressed using a pressure of 1 metric ton per sq. cm. and then reduced in an atmosphere of hydrogen at a temperature of 220° C. until water vapor is no longer detectable in the offgas.

The activity of this electrode matches that of the electrode prepared according to Example 1; it is distinguished however by a better mechanical stability.

(b) Analogous results are achieved by using, instead of the impregnating solution specified under (a), a saturated solution of cobalt nitrate to which 330 ml. of a 40% by weight acetic acid solution has been added per liter.

*Example 4*

350 ml. of an aluminum nitrate solution which has been prepared by dissolving 2.5 parts by weight of crystallized aluminum nitrate in 1 part by weight of water is added to 100 g. of carbonyl nickel powder having a bulk density of 0.4 g./ccm. The mixture reacts after a short time with evolution of heat. About 200 ml. of water is added and the mixture is heated for two hours at a temperature of 80° to 90° C. The mixture is then introduced into 1 liter of a 20% aqueous solution of potassium hydroxide. The potassium hydroxide solution is allowed to act for ninety minutes at a temperature of 50° C. and the treated powder is then filtered off and rinsed well with water. The powder is dried at 100° C. and then ground and forced through a screen having 10,000 meshes per sq. cm. The finely powdered mixture is mixed with further nickel powder in the ratio 1:1 and pressed into tablets having a diameter of 20 mm. and a thickness of 3 mm. under a pressure of 1 metric ton per sq. cm. The tablets are reduced in an atmosphere of hydrogen as described in Example 1.

The properties of the electrodes thus prepared match those of the electrodes prepared according to Example 1.

I claim:

1. A process for the production of negative electrodes for fuel cells wherein an aqueous solution of at least one salt of a weakly basic metal is allowed to act in the presence of oxidizing anions on a powdered metal selected from the group consisting of nickel, cobalt and mixtures thereof, then an aqueous solution of a hydroxide of an alkali metal is allowed to act on the metal, which is then washed with water and reduced with hydrogen at temperatures of 200° to 900° C. after the treated metal powder has been made into a shaped article having the dimensions of the desired electrode, said reduction with hydrogen being carried out until water vapor is no longer detectable in the off-gas.

2. A process as claimed in claim 1 wherein the weakly basic metal is a member selected from the group consisting of aluminum, zinc, chromium, nickel, cobalt, titanium, zirconium and mixtures thereof.

3. A process as claimed in claim 1 wherein the oxidizing anions are a member selected from the group consisting of chlorate ions, persulfate ions and nitrate ions and mixtures thereof.

4. A process for the production of negative electrodes for fuel cells wherein a porous framework made by sintering a metal powder, said metal being a member selected from the group consisting of nickel, cobalt and mixtures thereof, is impregnated with an aqueous solution of at least one salt of a weakly basic metal in the presence of oxidizing anions, the framework is then treated with an aqueous solution of a hydroxide of an alkali metal, subsequently washed with water and reduced with hydrogen at temperatures of 200° to 900° C. until water vapor is no longer detectable in the off-gas.

5. A process as claimed in claim 4 wherein the treated metal is dried after the washing step.

6. A process as claimed in claim 4 wherein the solution of the salt of the weakly basic metal is allowed to act on the metal powder at a temperature of from 20° to 90° C.

7. A process as claimed in claim 4 wherein a weak acid is added to the salt solution.

8. A process as claimed in claim 4 wherein the weakly basic metal is a member selected from the group consisting of aluminum zinc, chromium, nickel, cobalt, titanium, zirconium and mixtures thereof.

9. A process as claimed in claim 4 wherein the oxidizing anions are a member selected from the group consisting of chlorate ions, persulfate ions, nitrate ions and mixtures thereof.

10. A process as claimed in claim 4 wherein the framework containing the solution of the weakly basic metal is kept in an atmosphere saturated with water vapor at a temperature of 60° to 90° C. prior to being treated with the alkali metal hydroxide solution.

11. A process for the production of activated metals suitable as material for negative electrodes for fuel cells wherein an aqueous solution of at least one salt of a weakly basic metal is allowed to act in the presence of oxidizing anions on a metal selected from the group consisting of nickel, cobalt and mixtures thereof, an aqueous solution of a hydroxide of an alkali metal is allowed to act on said metal and the latter is then washed with water and reduced with hydrogen at temperatures of 200° to 900° C. until water vapor is no longer detectable in the off-gas.

References Cited

UNITED STATES PATENTS

| | | | |
|---|---|---|---|
| 2,669,598 | 2/1954 | Marko et al. | 136—122 |
| 3,041,388 | 6/1962 | Fukuda et al. | 136—29 |
| 3,068,310 | 12/1962 | Casey et al. | 136—24 |
| 3,077,507 | 2/1963 | Kordesch et al. | 136—86 |
| 3,183,124 | 5/1965 | Jasinski | 136—120 |
| 3,198,667 | 8/1965 | Gladrow et al | 136—122 |
| 3,228,795 | 1/1966 | Ackermann | 136—29 |

FOREIGN PATENTS 719,013  11/1954  Great Britain.

WINSTON A. DOUGLAS, *Primary Examiner.*

ALLEN B. CURTIS, *Examiner.*

A. S. KAPARS, *Assistant Examiner.*